United States Patent
Song

(10) Patent No.: US 9,941,689 B2
(45) Date of Patent: Apr. 10, 2018

(54) SWITCHING MODE POWER SUPPLY INCLUDING SURGE PROTECTION CIRCUIT AND IMAGE FORMING APPARATUS INCLUDING THE SAME

(71) Applicant: S-PRINTING SOLUTION CO., LTD., Suwon-si, Gyeonggi-do (KR)

(72) Inventor: Young-jun Song, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 617 days.

(21) Appl. No.: 13/645,833

(22) Filed: Oct. 5, 2012

(65) Prior Publication Data

US 2013/0114175 A1    May 9, 2013

(30) Foreign Application Priority Data

Nov. 7, 2011 (KR) .................. 10-2011-0115359
Jan. 13, 2012 (KR) .................. 10-2012-0004521

(51) Int. Cl.
*H02H 3/22* (2006.01)
*H02H 7/12* (2006.01)
(Continued)

(52) U.S. Cl.
CPC .............. *H02H 7/12* (2013.01); *H02M 1/32* (2013.01); *H02M 3/33523* (2013.01)

(58) Field of Classification Search
CPC .......... H01L 23/552; H01L 2924/3011; H01L 27/0248; H01L 27/0266; H01L 27/0251;
(Continued)

(56) References Cited

U.S. PATENT DOCUMENTS 3,970,900 A * 7/1976 Hodgins ............... H02H 9/046
                                                323/276
5,771,162 A   6/1998 Kwon
(Continued)

FOREIGN PATENT DOCUMENTS

CN    101304211 A    11/2008
CN    101605422      12/2009
(Continued)

OTHER PUBLICATIONS

Office Action dated Feb. 4, 2016 in Chinese Patent Application No. 201210441148.X.
(Continued)

*Primary Examiner* — Thienvu Tran
*Assistant Examiner* — Nicolas Bellido
(74) *Attorney, Agent, or Firm* — Staas & Halsey LLP

(57) ABSTRACT

A switching mode power supply (SMPS) including a surge protection unit that is connected to a protection pin of a pulse width modulation (PWM) controller to cut off a power supply of the SMPS when a voltage that is applied to the protection pin exceeds a predetermined threshold voltage, where the surge protection unit blocks an external surge voltage lower than a surge protection capacity of the surge protection unit for blocking a surge voltage input from outside thereof, and, when the output voltage of the SMPS is not within the predetermined range, the surge protection unit applies a voltage obtained by subtracting the surge protection capacity of the surge protection unit from a predetermined feedback voltage output from a feedback unit to the protection pin, and where the surge protection capacity is set higher than the predetermined threshold voltage of the protection pin.

17 Claims, 8 Drawing Sheets

(51) Int. Cl.
*H02M 1/32* (2007.01)
*H02M 3/335* (2006.01)

(58) Field of Classification Search
CPC ...... H01R 13/6666; H01C 7/12; H02H 9/042; H02H 3/202; H02H 9/04; H02H 9/041; H02H 9/046; H03K 17/0822; H03K 17/0826; H03K 17/08146; H03F 1/52; H02M 1/32; H02J 7/0031
USPC .................................. 361/86, 91.6, 111, 118
See application file for complete search history.

(56) References Cited

U.S. PATENT DOCUMENTS

| | | | |
|---|---|---|---|
| 7,787,269 B2 | 8/2010 | Murata | |
| 2004/0264087 A1* | 12/2004 | Bishop | H04M 1/745 361/91.1 |
| 2008/0278134 A1 | 11/2008 | Murata | |

FOREIGN PATENT DOCUMENTS

| | | |
|---|---|---|
| JP | 2004-153952 | 5/2004 |
| JP | 2006-121808 | 5/2006 |
| KR | 91-3509 | 2/1991 |
| KR | 10-0184568 | 5/1999 |
| KR | 10-2008-0112704 | 12/2008 |

OTHER PUBLICATIONS

Chinese Office Action dated May 4, 2017 in corresponding Chinese Patent Application No. 201210441148.X.
Chinese Office Action dated Oct. 25, 2016 in corresponding Chinese Patent Application No. 201210441148.X.

* cited by examiner

SWITCHING MODE POWER SUPPLY INCLUDING SURGE PROTECTION CIRCUIT AND IMAGE FORMING APPARATUS INCLUDING THE SAME

CROSS-REFERENCE TO RELATED APPLICATIONS

This application claims priority under 35 U.S.C. § 119(a) from Korean Patent Application No. 10-2011-0115359, filed on Nov. 7, 2011 and Korean Patent Application No. 10-2012-0004521, filed on Jan. 13, 2012 in the Korean Intellectual Property Office, the disclosures of which are incorporated herein in their entirety by reference.

BACKGROUND OF THE INVENTION

1. Field of the Invention

The present general inventive concept relates to a switching mode power supply (SMPS) that includes a surge protection circuit for preventing a malfunction of the SMPS.

2. Description of the Related Art

A switching mode power supply (SMPS) converts an alternating current (AC) power supply into a direct current (DC) power supply that is required by various electronic apparatuses such as computers or communication apparatuses. The SMPS has merits such as small size, high efficiency, light weight, and the like compared to a linear type power supply and thus is widely used. In particular, the SMPS is contained in an image forming apparatus such as a printer, a scanner, a fax machine, or a multifunctional printer and converts an AC power supply provided from the outside into a DC power supply to supply the DC power supply to components such as a main controller and the like in the image forming apparatus.

In the SMPS, a primary circuit of a transformer receives an AC power supply and rectifies and smoothes the AC power supply, and then applies a rectified and smoothed voltage to a primary coil of the transformer. Then, a voltage that is induced in a secondary coil of the transformer passes through a secondary circuit of the transformer, and a DC voltage that is output through the secondary circuit is applied to a load. At this time, it is necessary to adjust the output of the secondary circuit, which is applied to the load. This is possible by applying a control signal to a switching device connected to the primary circuit of the transformer by using a pulse width modulation (PWM) controller included in the SMPS to adjust a duty ratio of a current flowing through the primary circuit of the transformer.

The PWM controller receives the output of the secondary circuit of the transformer and may perform a protection function by stopping, rebooting, or resetting the SMPS when the output voltage is in an abnormal state, i.e., an overvoltage or excessive current state. In detail, the output voltage of the secondary circuit of the transformer is fed back to a protection pin of the PWM controller, and the PWM controller senses the abnormal state when a voltage of the protection pin exceeds a threshold voltage and then stops, reboots, or resets the SMPS.

SUMMARY OF THE INVENTION

The present general inventive concept provides a switching mode power supply (SMPS) that includes a surge protection circuit to minimize and/or prevent a malfunction due to surge noise.

Additional features and utilities of the present general inventive concept will be set forth in part in the description which follows and, in part, will be obvious from the description, or may be learned by practice of the general inventive concept.

Exemplary embodiments of the present general inventive concept provide a switching mode power supply (SMPS) including a feedback unit to output a predetermined feedback voltage when an output voltage of the SMPS is not within a predetermined range, a pulse width modulation (PWM) controller that includes a protection pin and cuts off a power supply of the SMPS when a voltage that is applied to the protection pin exceeds a predetermined threshold voltage, and a surge protection unit that is connected to the protection pin, where the surge protection unit blocks an external surge voltage lower than a surge protection capacity of the surge protection unit for blocking a surge voltage input from outside thereof, and, when the output voltage of the SMPS is not within the predetermined range, the surge protection unit applies a voltage obtained by subtracting the surge protection capacity of the surge protection unit from the predetermined feedback voltage output from the feedback unit to the protection pin, and where the surge protection capacity is set higher than the predetermined threshold voltage of the protection pin.

Exemplary embodiments of the present general inventive concept can also provide an image forming apparatus including a switching mode power supply (SMPS) to convert an alternating current (AC) power supply into a direct current (DC) power supply to power the image forming apparatus, where the SMPS includes a feedback unit to output a predetermined feedback voltage when an output voltage of the SMPS is not within a predetermined range, a pulse width modulation (PWM) controller that includes a protection pin and cuts off a power supply of the SMPS when a voltage that is applied to the protection pin exceeds a predetermined threshold voltage, and a surge protection unit that is connected to the protection pin, where the surge protection unit to block an external surge voltage lower than a surge protection capacity of the surge protection unit for blocking a surge voltage input from outside thereof, and, when the output voltage of the SMPS is not within the predetermined range, the surge protection unit to apply a voltage obtained by subtracting the surge protection capacity of the surge protection unit from the predetermined feedback voltage output from the feedback unit to the protection pin, and where the surge protection capacity is set higher than the predetermined threshold voltage of the protection pin.

In the SMPS according to the present general inventive concept, a malfunction of the SMPS may be minimized and/or prevented by serially connecting a Zener diode to a protection pin of a PWM controller in a reverse direction to prevent surge noise from flowing in the protection pin of the PWM controller. By serially connecting a resistor or a bead to the Zener diode, a peak current may be damped or a surge noise may be instantaneously suppressed. By connecting a capacitor or varistor to the Zener diode in parallel, surge noise may be suppressed, and a malfunction in the SMPS may be more effectively prevented.

Exemplary embodiments of the present general inventive concept also provide a power supply apparatus including a feedback unit to output a predetermined feedback voltage when an output voltage of the power supply is not within a predetermined range, a controller to cut off a power to the power supply when a voltage received by the controller exceeds a predetermined threshold voltage, and a surge protection unit that is connected to the controller, the surge protection unit to block an external surge voltage lower than a surge protection capacity of the surge protection unit for blocking a surge voltage input from outside thereof, and, when the output voltage of the power supply is not within the predetermined range, the surge protection unit to apply a voltage obtained by subtracting the surge protection capacity of the surge protection unit from the predetermined feedback voltage output from the feedback unit to the controller, the surge protection capacity being set higher than the predetermined threshold voltage of the controller.

Exemplary embodiments of the present general inventive concept also provide electronic device including a power supply to power the electronic device, having a feedback unit to output a predetermined feedback voltage when an output voltage of the power supply is not within a predetermined range, a controller to cut off the power when a voltage received by the controller exceeds a predetermined threshold voltage, and a surge protection unit that is connected to the controller, the surge protection unit to block an external surge voltage lower than a surge protection capacity of the surge protection unit for blocking a surge voltage input from outside thereof, and, when the output voltage of the is not within the predetermined range, the surge protection unit to apply a voltage obtained by subtracting the surge protection capacity of the surge protection unit from the predetermined feedback voltage output from the feedback unit to the protection pin, the surge protection capacity is set higher than the predetermined threshold voltage of the protection pin, and an interface powered by the power supply to receive input and display output messages in connection with the operation of the electronic device.

Exemplary embodiments of the present general inventive concept also provide a method of providing power to an electronic device, the method including outputting a predetermined feedback voltage when an output voltage of a power supply that provides power to the electronic device is not within a predetermined range, cutting off a power to the power supply when a voltage that is received by a controller of the power supply exceeds a predetermined threshold voltage, blocking an external surge voltage that is lower than a surge protection capacity of a surge protection unit for blocking a surge voltage input from outside thereof, and when the output voltage of the power supply is not within the predetermined range, applying a voltage obtained by subtracting the surge protection capacity of the surge protection unit from the predetermined feedback voltage output from the feedback unit to the protection pin, the surge protection capacity being set higher than the predetermined threshold voltage of the protection pin.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
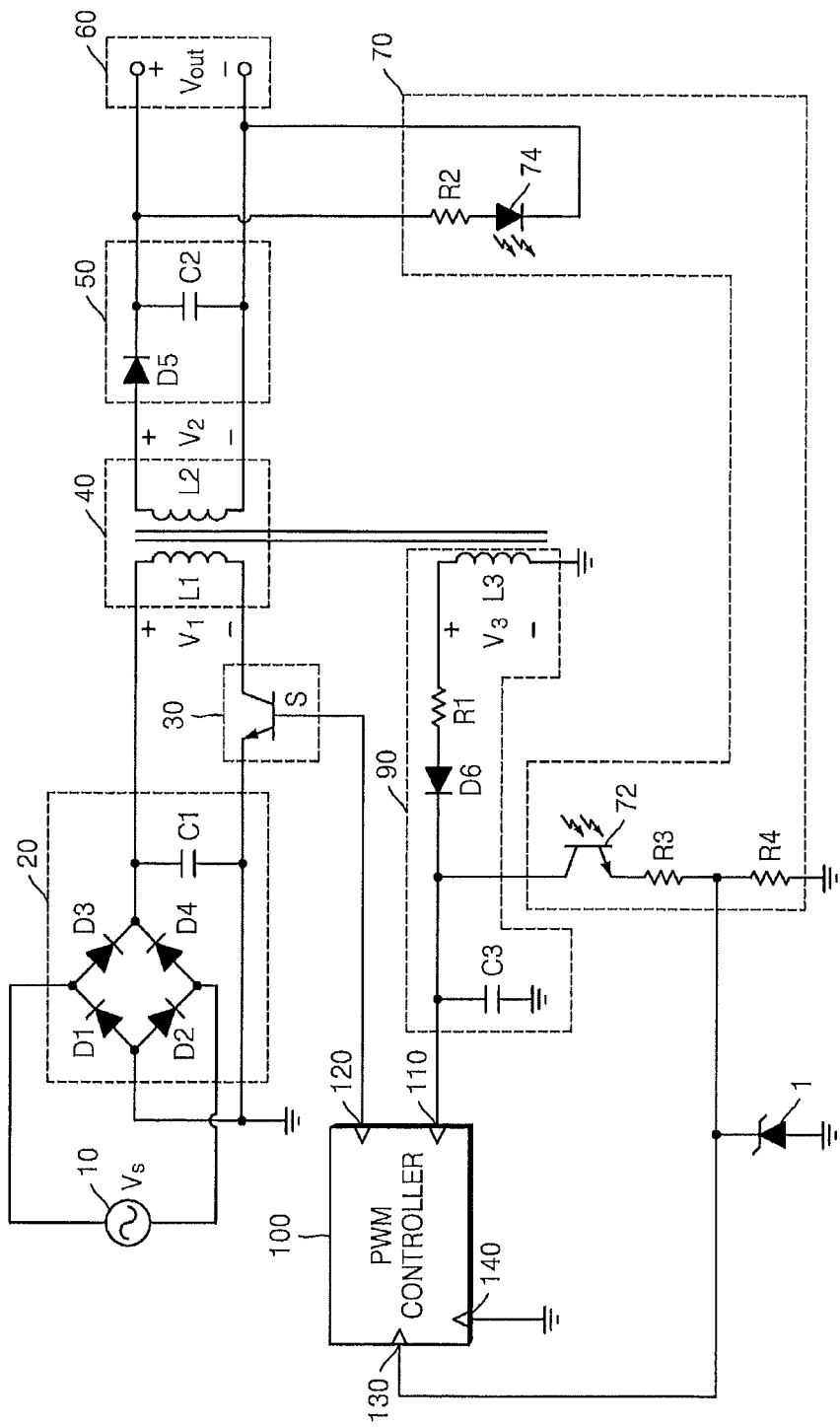
FIG. 1 is a circuit diagram of a conventional switching mode power supply (SMPS) including a surge protection circuit.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

A conventional switching mode power supply (SMPS) including a surge protection circuit as illustrated in FIG. 1 will be described before describing a SMPS including a surge protection circuit according to exemplary embodiments of the present general inventive concept.

FIG. 1 illustrates a circuit diagram of a conventional SMPS including a surge protection circuit. Referring to FIG. 1, the conventional SMPS includes a power supplier 10, a first rectifier 20, a switching unit 30, a transformer 40, a second rectifier 50, a voltage output unit 60, a feedback unit 70, a Zener diode 1, an auxiliary coil unit 90, and a pulse width modulation (PWM) controller 100.

The power supplier 10 provides a constant alternating current (AC) power supply, and a common use AC power supplier that is generally used in the home may correspond to the power supplier 10. An AC power supply provided from the power supplier 10 is rectified and smoothed through the first rectifier 20 included in a primary circuit of the transformer 40 to be applied as a primary voltage V1 of the transformer 40. The first rectifier 20 includes a diode bridge, which has four diodes D1 through D4, and a capacitor C1. The diode bridge rectifies the AC power supply, and the capacitor C1 smoothes the rectified AC power supply to generate the primary voltage V1. The configuration of the rectifier 20 illustrated in FIG. 1 is exemplary and the present general inventive concept is not limited thereto, and may be replaced with a configuration of a circuit having any other form, which may perform a rectifying and smoothing function.

The PWM controller 100 is driven by receiving a power supply from the auxiliary coil unit 90 that includes an auxiliary coil L3 inductively coupled with a first coil L1 and a second coil L2 of the transformer 40. A DC power supply generated as a voltage V3 of the auxiliary coil L3 passes through the auxiliary coil unit 90, which includes a resistor R1, a diode D6, and a capacitor C3, and is input to a power pin 110 of the PWM controller 110. The PWM controller 100 includes a ground pin 140 to connect the PWM controller 100 to ground.

The PWM controller 100 applies a control signal output from a control pin 120 thereof to a switch S of the switching unit 30 to adjust an on/off duty ratio of the switch S, and thus, a secondary voltage V2 is induced at a secondary side of the transformer 40. The induced secondary voltage V2 is applied to a load of the voltage output unit 60 as an output voltage Vout through a second rectifier 50 formed of a diode D5 and a capacitor C2.

The PWM controller 100 provides a protection function of cutting off the power supply when an abnormal state, such as when the output voltage Vout abruptly increases, occurs. A predetermined voltage is fed back to a protection pin 130 of the PWM controller 100 when the output voltage Vout is in the abnormal state, and the PWM controller 100 cuts off the power supply by stopping, rebooting, or resetting the SMPS when sensing the abnormal state from the certain voltage input through the protection pin 130.

In detail, if a current flows through a resistor R2 and a photodiode 74 due to the output voltage Vout of the voltage output unit 60, the photodiode 74 generates light, and a phototransistor 72 receives the light generated from the photodiode 74 and passes a current. The photodiode 74 and the phototransistor 72 can be an opto-coupler. When the output voltage Vout is in the abnormal state such as an overvoltage state, the phototransistor 72 of the opto-coupler receives the light generated from the photodiode 74 and passes the current. A voltage that is obtained by multiplying a value R4/(R3+R4) by the voltage V3 of the auxiliary coil L3 is applied to the protection pin 130 of the PWM controller 100. The R3 and the R4 are resistance values of resistors of the feedback unit 70. A voltage that is dropped by the resistor R1 and the diode D6 is smaller than the voltage V3 (e.g., very small compared to the voltage V3), and thus, the dropped voltage may be disregarded.

The PWM controller 100 can operate in a protection mode to stop or reset the SMPS when a voltage applied to the protection pin 130 exceeds a predetermined threshold voltage. Thus, the protection mode may be performed by setting and/or selecting the resistance values R3 and R4 so that the phototransistor 72 is turned on and a voltage applied to the protection pin 130 of the PWM controller 100 exceeds the predetermined threshold voltage when the output voltage Vout is in the abnormal state. Although, as illustrated in FIG. 2, the photodiode 74 and the phototransistor 72 of the opto-coupler are disposed so as to be spaced apart from one another by a predetermined distance (e.g., fairly far apart from each other), the photodiode 74 and the phototransistor 72 can be disposed so as to be located adjacent to each other to form the opto-coupler device.

If a noise type surge voltage is applied to the protection pin 130 of the PWM controller 100 from the outside due to, for example, lightning, although the phototransistor 72 is not turned on since the output voltage Vout is in a normal state, the PWM controller 100 may falsely determine this state as an abnormal state and operate in the protection mode. Thus, in order to minimize and/or prevent this problem, in FIG. 1, a Zener diode 1 is connected in parallel with the protection pin 130 of the PWM controller 100 to perform a clamping function (e.g., fix the voltage upper limit or the voltage lower limit). However, when the Zener diode 1 is connected in parallel with the protection pin 130, a normal operation or a mis-operation of the SMPS system is determined by a clamping response speed of the Zener diode 1, and thus, it is difficult to maintain stable Zener clamping performance due to differences in the response speed according to tolerances by vendors of the Zener diode 1.

The protecting pin 130 and ground may be temporary shorted to each other when a current instantaneously flows from the protection pin 130 to ground at a voltage that is more than a breakdown voltage of the Zener diode 1 during an inflow of a surge voltage, and thus, the SMPS system may operate defectively. When the Zener diode 1 is connected in parallel with the protection pin 130 does not have a predetermined effect (e.g., a large effect) on a noise type surge voltage that is repeatedly induced. For example, the threshold voltage of the protection pin 130 of the PWM controller 100 has been lowered, for example, below 1.85 volt (V). Since a minimum breakdown voltage of a general Zener diode is about 3.3 V based on 1 watt (W) and is about 2.4 V based on 5 W, the case of FIG. 1 where the Zener diode 1 is connected in parallel with the protection pin 130 has a limit in preventing a malfunction due to a surge voltage under the conditions in which a stable power supply less than 2 V should be supplied.

Figure 2:
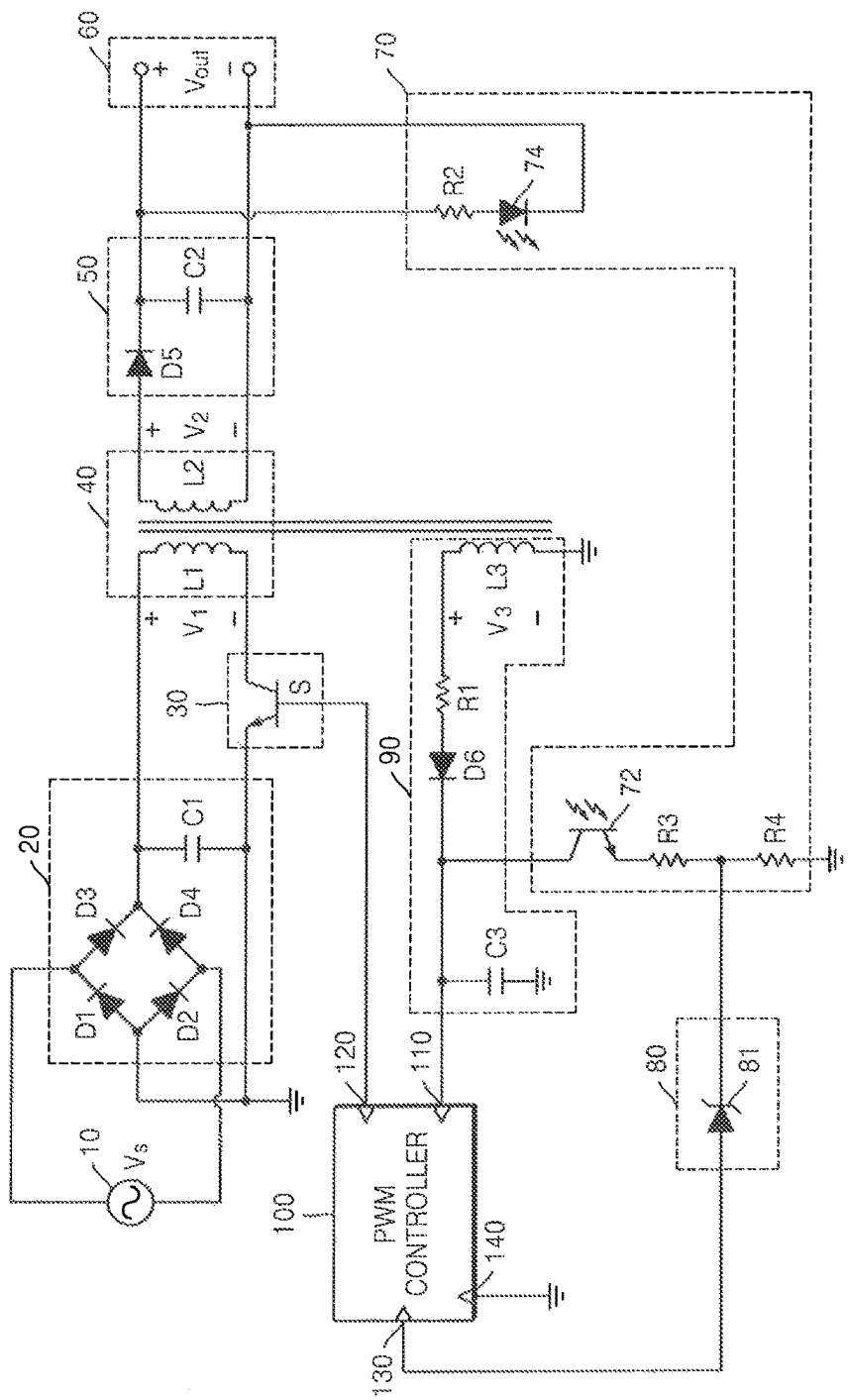
FIG. 2 illustrates a circuit diagram of a SMPS including a surge protection circuit according to exemplary embodiments of the present general inventive concept.

FIG. 2 illustrates a circuit diagram of a SMPS including a surge protection circuit according to exemplary embodiments of the present general inventive concept. Referring to FIG. 2, the SMPS includes a surge protection circuit 80 in which a Zener diode 81 is serially connected to a protection pin 130 of a PWM controller 100 in a reverse direction from that illustrated in FIG. 1. That is, FIG. 1 illustrates that the Zener diode 1 is connected in parallel with the protection pin 130 of the PWM controller 100, and FIG. 2 illustrates that the Zener diode 81 is serially connected to the protection pin 130 of the PWM controller 100 in a direction that is the reverse from the connection between the Zener diode 1 and the protection pin 130 illustrated in FIG. 1. The configuration of the SMPS of FIG. 2 is the same as that of the SMPS illustrated in FIG. 1 and described above except for the surge protection circuit 80. An anode of the Zener diode 81 is connected to the protection pin 130 of the PWM controller 100, and a cathode of the Zener diode 81 is connected to a connection point between two resistors R3 and R4 of a feedback unit 70.

Hereafter, numerical values such as voltage values are described as examples to more clearly explain the configuration of exemplary embodiments of the present general inventive concept. However, the numerical values exemplified may be changed (e.g., depending on a need and an objective, etc.), and the present general inventive concept is not limited thereto.

It may be assumed that a threshold voltage of the protection pin 130 of the PWM controller 100 is 1.85 V and a breakdown voltage of the Zener diode 81 is 12 V. That is, if a voltage of more than 13.85 V (i.e., the threshold voltage of the protection pin 130 of 1.85V added to the 12 V breakdown voltage of the Zener diode 81, the sum being 13.85V) is applied to the cathode of the Zener diode 81, a protection mode is initiated in the PWM controller 100 since a voltage of more than 1.85 V is applied to the protection pin 130. If it is assumed that an output voltage Vout of the SMPS in a normal state is 24 V, the case where the output voltage Vout has a difference of more than 5% compared to that of the normal state, that is, the output voltage Vout exceeds 25.2 V (i.e., 5% of 24 V of the normal state, which is 1.2, added with the 24 V normal state), is generally prescribed as an abnormal state. It can be assumed that a voltage V3 of an auxiliary coil L3 is 22 V.

In this case, if the output voltage Vout becomes more than 25.2 V, a photodiode 72 of the feedback unit 70 is turned on, and thus, a voltage of 22*(R4/(R3+R4)) volts is applied to the cathode of the Zener diode 81, where the multiplier 22 of the 22*(R4/(R3+R4)) is the voltage V3 of the auxiliary coil L3 (i.e., 22V). R3 and the R4 are resistance values of resistors of the feedback unit 70. If a voltage of the cathode of the Zener diode 81 becomes 14 V by adjusting R3 and R4, 2 V that exceeds the threshold voltage is applied to the protection pin 130, and thus, the PWM controller 100 may operate in a protection mode. However, if the output voltage Vout does not exceed 25.2 V and thus is in a normal state, no voltage is applied to the cathode of the Zener diode 81 by the feedback unit 60. That is, the PWM controller does not transition so as to operate in a protection mode. Thus, in this case, although there is a surge voltage input from the outside, a surge voltage less than 12 V, which is the breakdown voltage of the Zener diode 81, is blocked. Although a surge voltage exceeding 12 V is input from the outside, a voltage that is dropped by the breakdown voltage 12 V is applied to the protection pin 130, and thus, the PWM controller 110 does not operate in a protection mode. That is, it is possible to prevent the PWM controller 100 from operating in the protection mode under undesired conditions due to a surge voltage. A size of a surge voltage which the surge protection unit 80 can block is a surge protection capacity. That is, in the exemplary embodiments of the present general inventive concept illustrated in FIG. 2, the surge protection capacity is a breakdown voltage of the Zener diode included in the surge protection unit 80.

Although the SMPS according to the exemplary embodiments illustrated in FIG. 2 is illustrated based on a fly-back converter, the present general inventive concept is not limited thereto and may use various types of converters. Circuit configurations of a first rectifier 20, a switching unit 30, a second rectifier 50, the feedback unit 70, an auxiliary coil unit 90, and the like, which are illustrated in FIG. 2, are exemplary and the present general inventive concept is not limited thereto, and may be changed with other circuits capable of performing the same functions and the exemplary embodiments of the present general concept disclosed herein.

Figure 3:
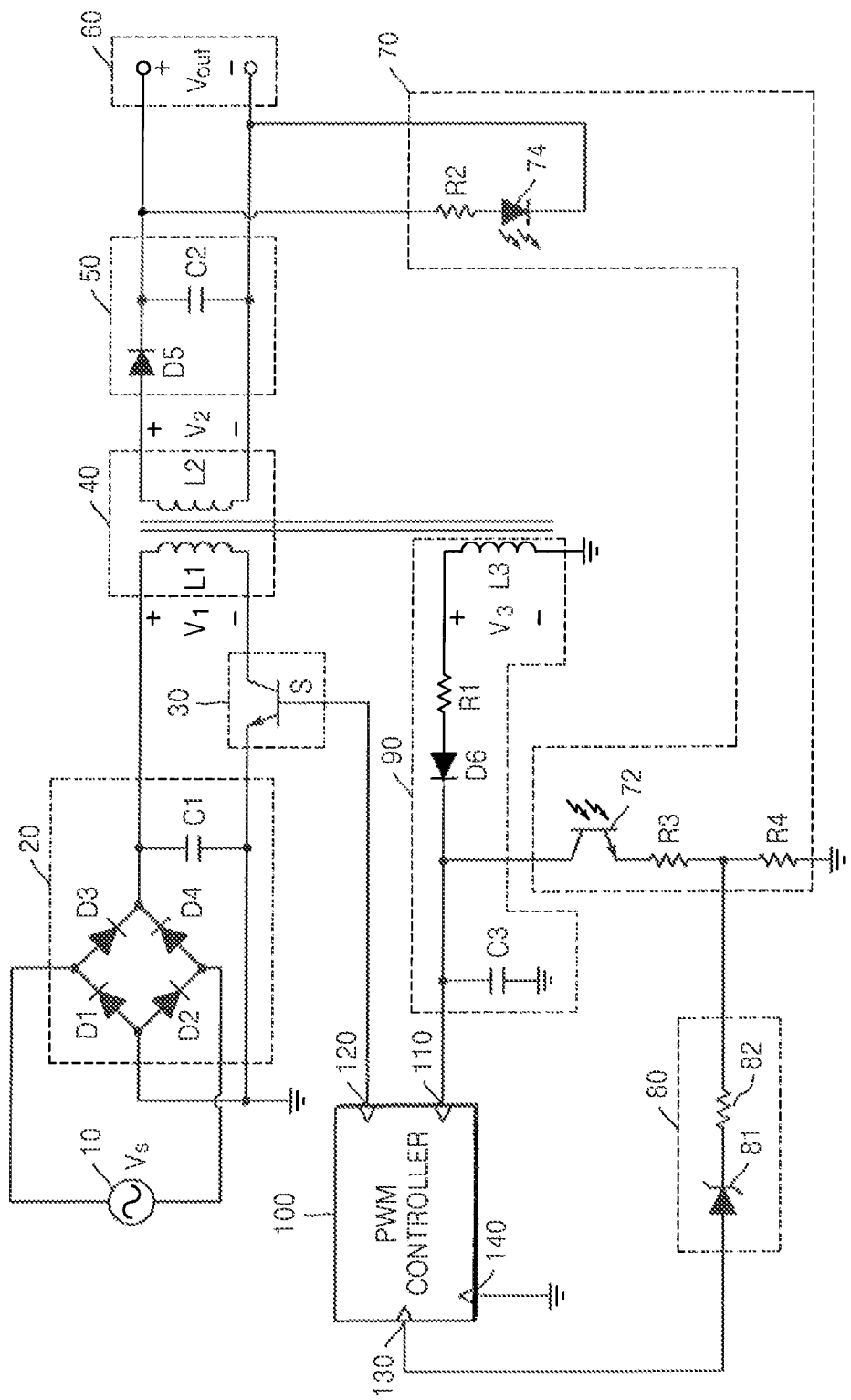
FIG. 3 illustrates a circuit diagram a SMPS including a surge protection circuit according to exemplary embodiments of the present general inventive concept.

FIG. 3 illustrates a circuit diagram of a SMPS including a surge protection circuit according to exemplary embodiments of the present general inventive concept. When comparing the SMPS of FIG. 3 with the SMPS of FIG. 2, the configuration of the SMPS of FIG. 3 is the same as that of the SMPS of FIG. 2 except for a surge protection circuit 80. The surge protection circuit 80 can be connected in series to the protection pin 130 of the PWM controller 100. In detail, the surge protection unit 80 includes a Zener diode 81 and a resistor 82 connected to the cathode of the Zener diode 81. The resistor 82 connected to the cathode of the Zener diode 81 can be a damping resistor that limits a peak current flowing through the Zener diode 81. Thus, the surge protection unit 80 that includes the resistor 82 as well as the Zener diode 81 may have increasing effectiveness to suppress surge noise so as to stably operate the SMPS, compared to the case where the surge protection unit 80 includes only the Zener diode 81. Although FIG. 3 illustrates that the resistor 82 is connected to the cathode of the Zener diode 81, the resistor 82 may be connected to any one from among the anode and the cathode of the Zener diode 81.

Figure 4:
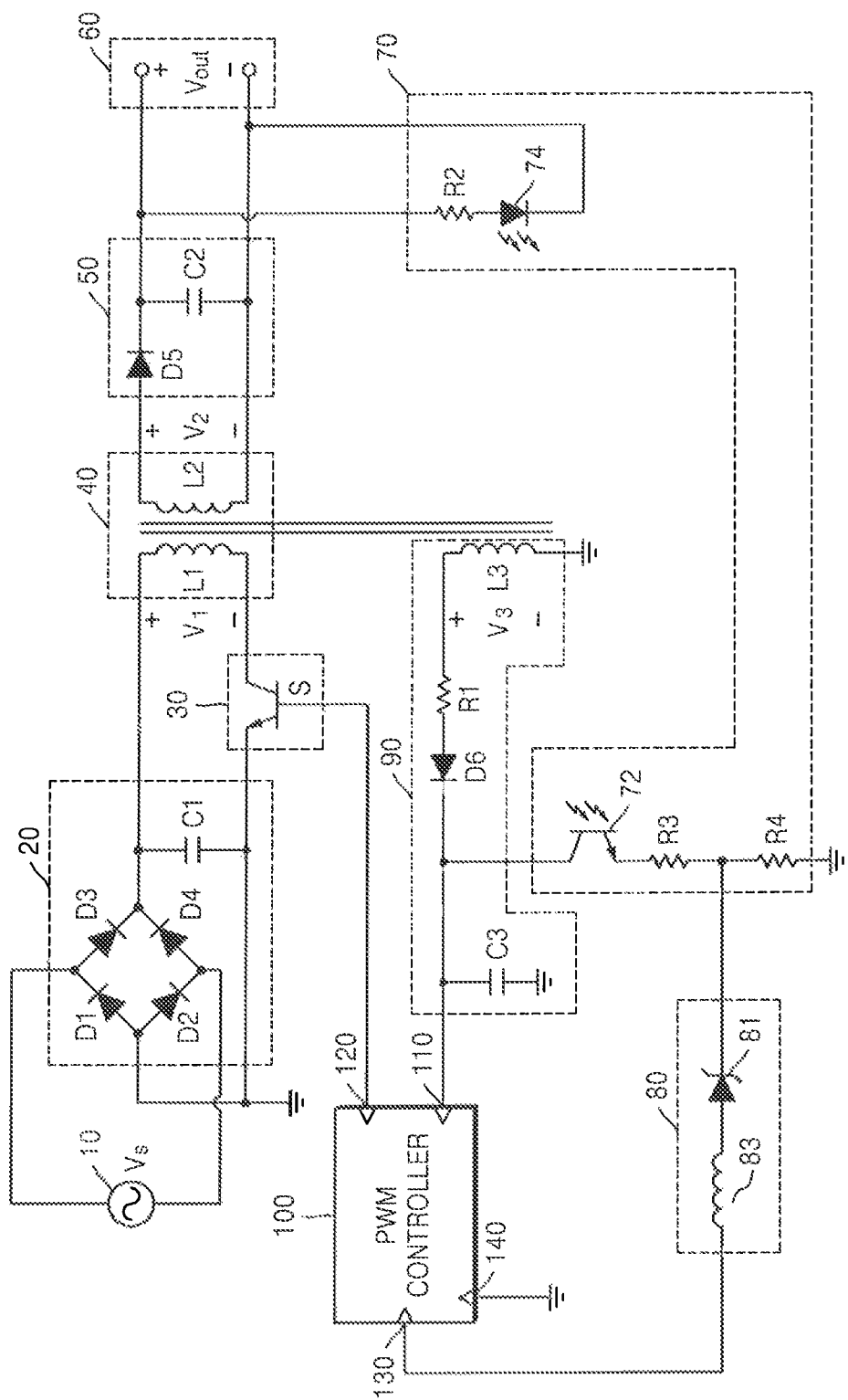
FIG. 4 illustrates a circuit diagram of a SMPS including a surge protection circuit according exemplary embodiments of the present general inventive concept.

FIG. 4 illustrates a circuit diagram of a SMPS including a surge protection circuit according to exemplary embodiments of the present general inventive concept. When comparing the SMPS of FIG. 4 with the SMPS of FIG. 2, the configuration of the SMPS of FIG. 4 is the same as that of the SMPS of FIG. 2 except for a surge protection circuit 80. The surge protection circuit 80 can be connected in series to the protection pin 130 of the PWM controller 100. In detail, the surge protection unit 80 includes a Zener diode 81 and a bead 83 connected to the anode of the Zener diode 81. The bead 83 connected to the anode of the Zener diode 81 momentarily suppresses surge noise input through the Zener diode 81 when the surge noise is received. Thus, the surge protection unit 80 that includes the bead 83 as well as the Zener diode 81 may have increasing effectiveness to suppress surge noise to stably operate the SMPS, compared to the case where the surge protection unit 80 includes only the Zener diode 81. Although FIG. 4 illustrates that the bead 83 is connected to the anode of the Zener diode 81, the bead 83 may be connected to any one from among the anode and the cathode of the Zener diode 81.

Figure 5:
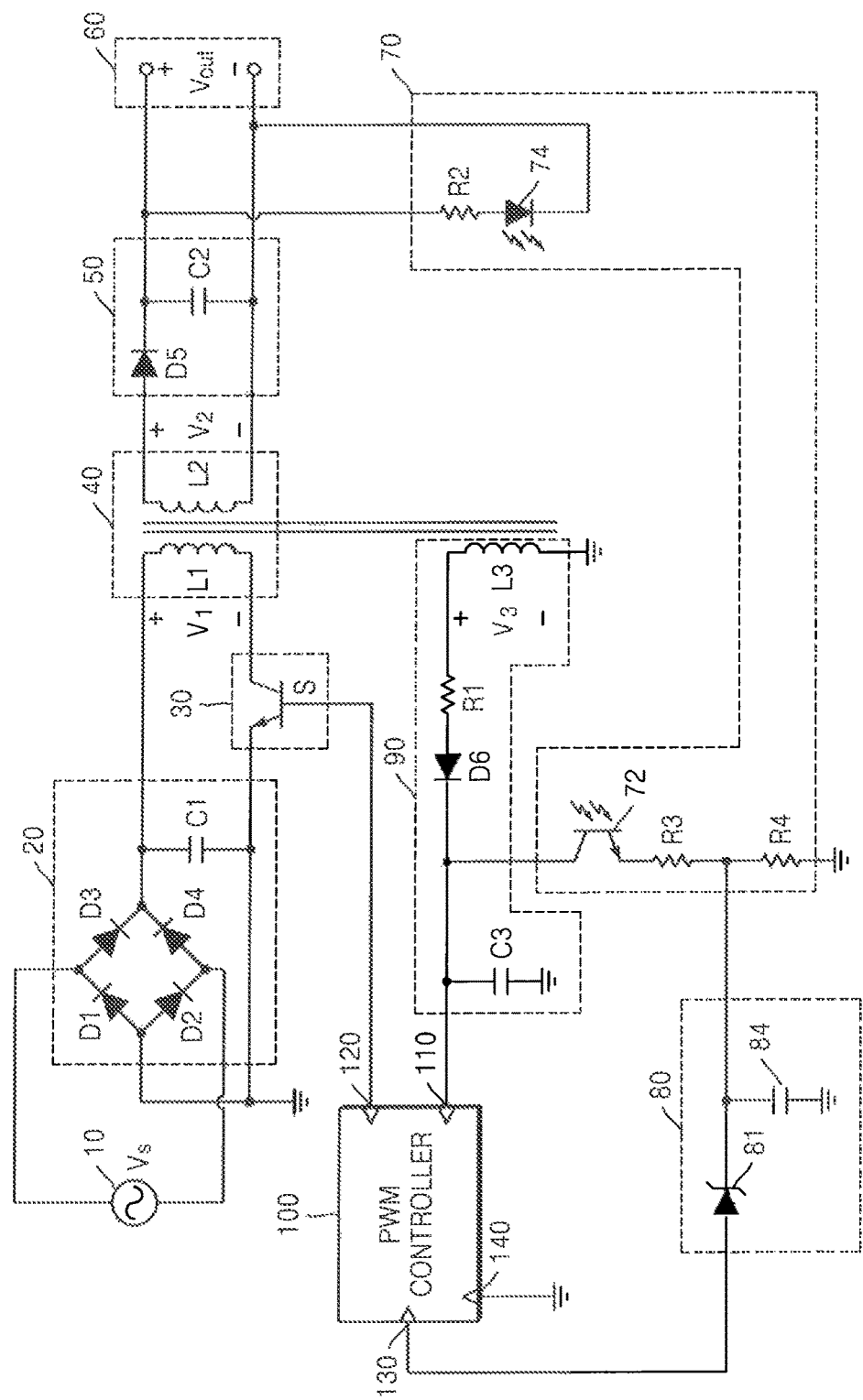
FIG. 5 illustrates a circuit diagram of a SMPS including a surge protection circuit according to exemplary embodiments of the present general inventive concept.

FIG. 5 illustrates a circuit diagram of a SMPS including a surge protection circuit according to exemplary embodiments of the present general inventive concept. When comparing the SMPS of FIG. 5 with the SMPS of FIG. 2, the configuration of the SMPS of FIG. 5 is the same as that of the SMPS of FIG. 2 except for the surge protection circuit 80. In detail, the surge protection unit 80 includes a Zener diode 81 and a capacitor 84 connected between the cathode of the Zener diode 81 and ground. The capacitor 84 connected between the cathode of the Zener diode 81 and ground at least partially absorbs and suppresses surge noise. That is, the capacitor 84 at least partially minimizes and/or suppresses surge noise. The surge protection unit 80 that includes the capacitor 84 as well as the Zener diode 81 may have increasing effectiveness to suppress the surge noise to stably operate the SMPS, compared to the case where the surge protection unit 80 includes only the Zener diode 81. Although FIG. 4 illustrates that the capacitor 84 is connected between the cathode of the Zener diode 81 and ground, the capacitor 84 may be connected to any one from among the anode and the cathode of the Zener diode 81.

Figure 6:
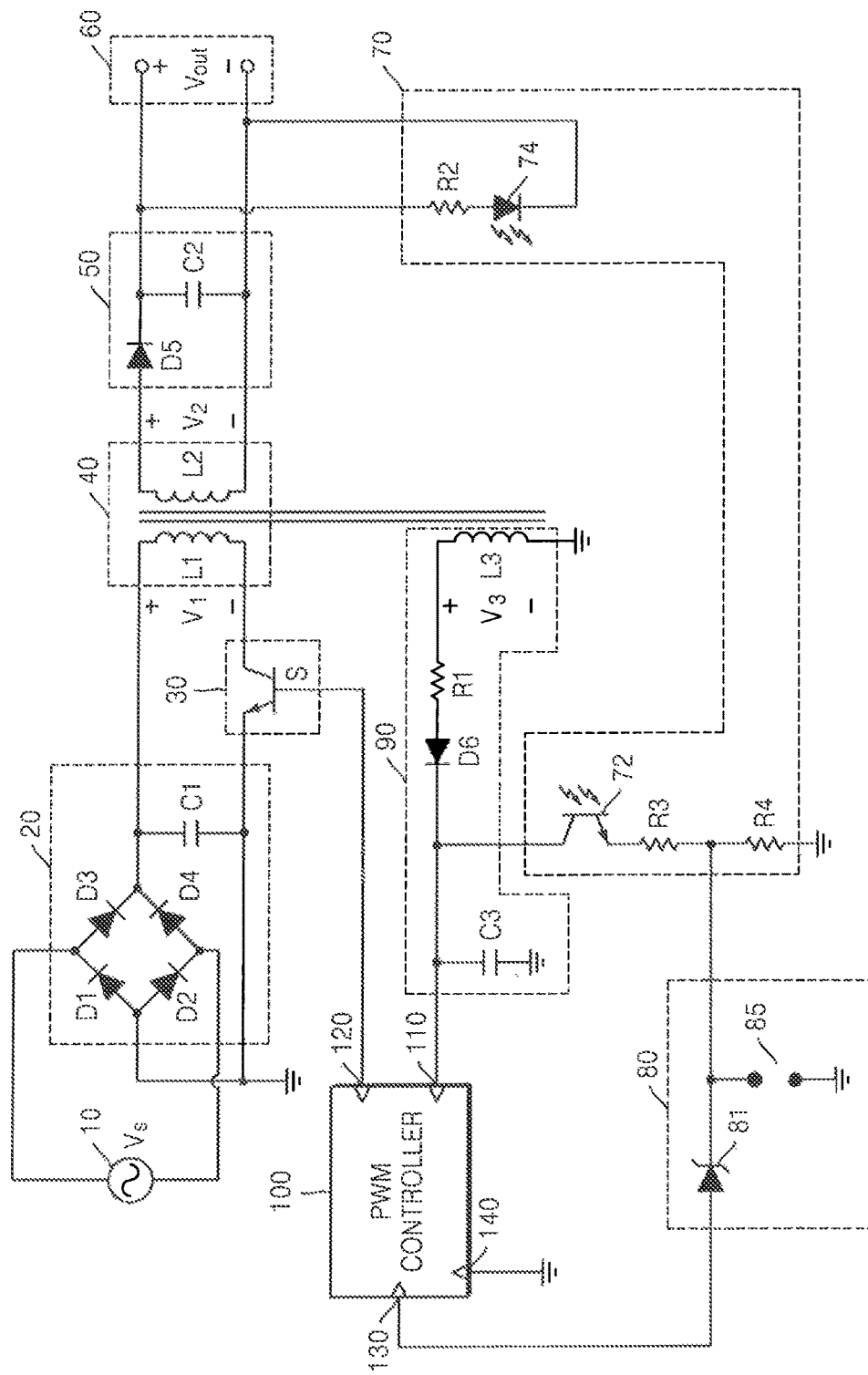
FIG. 6 illustrates a circuit diagram of a SMPS including a surge protection circuit according to exemplary embodiments of the present general inventive concept.

FIG. 6 illustrates a circuit diagram of a SMPS including a surge protection circuit according to exemplary embodiments of the present general inventive concept. When comparing the SMPS of FIG. 6 with the SMPS of FIG. 2, the configuration of the SMPS of FIG. 6 is the same as that of the SMPS of FIG. 2 except for a surge protection circuit 80. In detail, the surge protection unit 80 includes a Zener diode 81 and a varistor 85 connected between the cathode of the Zener diode 81 and ground. The varistor 85 that is a variable resistor which has a resistance value that is changed depending on a voltage between both ends thereof. The varistor 85 can be connected between the cathode of the Zener diode 81 and ground so as to clamp and suppress surge noise. Thus, the surge protection unit 80 that includes the varistor 85 as well as the Zener diode 81 may having increasing effectiveness to suppress the surge noise to stably operate the SMPS, compared to the case where the surge protection unit 80 includes only the Zener diode 81. Although FIG. 6 illustrates that the varistor 85 is connected between the cathode of the Zener diode 81 and ground, the varistor 85 may be connected to any one from among the anode and the cathode of the Zener diode 81.

Figure 7:
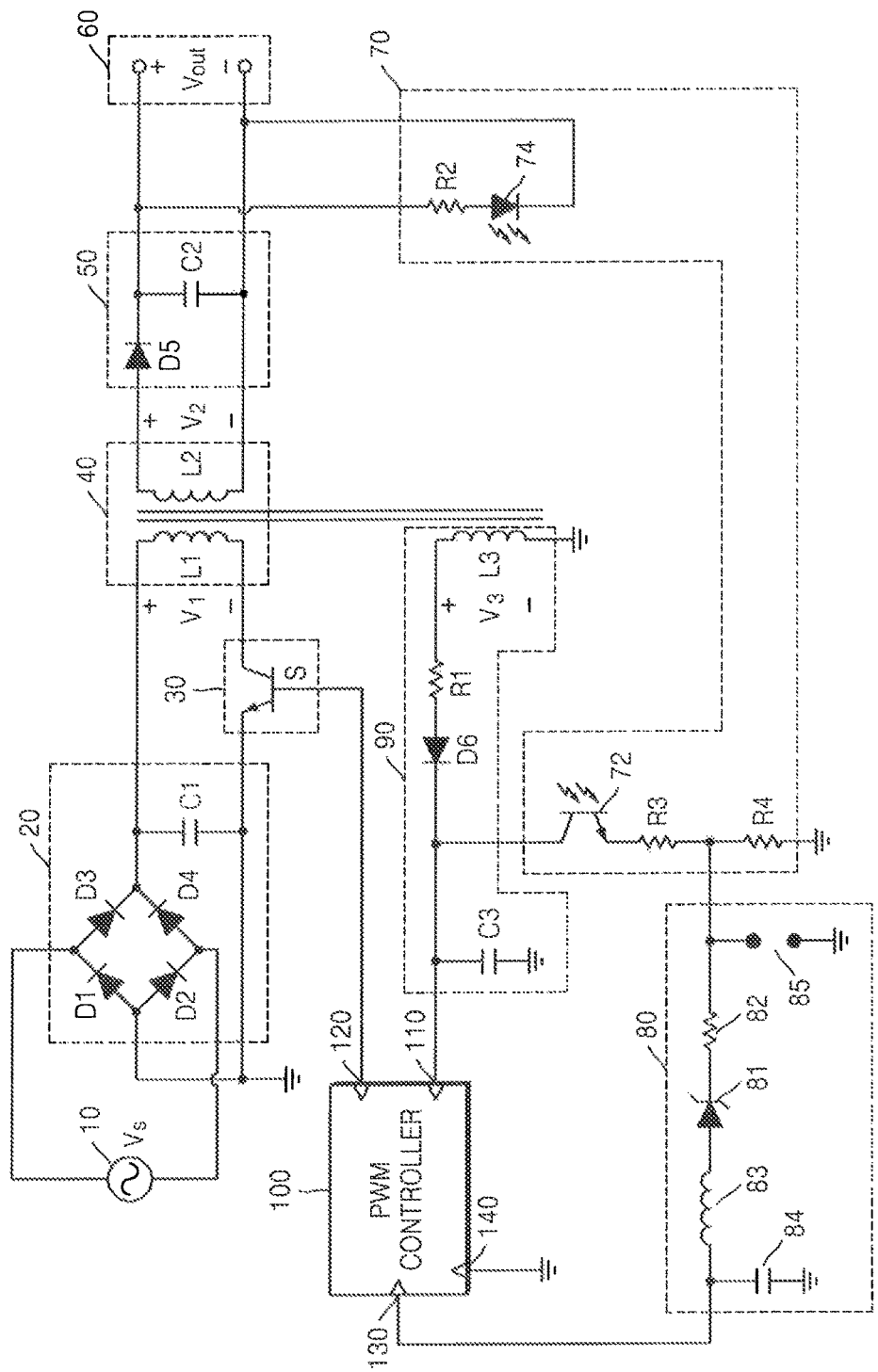
FIG. 7 illustrates a circuit diagram of a SMPS including a surge protection circuit according to exemplary embodiments of the present general inventive concept.

FIG. 7 illustrates a circuit diagram of a SMPS including a surge protection circuit according to exemplary embodiments of the present general inventive concept. When comparing the SMPS of FIG. 7 with the SMPS of FIG. 2, the configuration of the SMPS of FIG. 7 is the same as that of the SMPS of FIG. 2 except for a surge protection circuit 80. In detail, the surge protection unit 80 includes a Zener diode 81, a resistor 82, a bead 83, a capacitor 84, and a varistor 85. The surge protection unit 80 of FIG. 7, which includes the resistor 82, the bead 83, the capacitor 84, and the varistor 85, as well as the Zener diode 81, may have increase the suppression of surge noise compared to the surge protection units 80 illustrated in FIGS. 2 through 5, which respectively include only one from among the resistor 82, the bead 83, the capacitor 84, and the varistor 85, as well as the Zener diode 81. Although FIG. 7 illustrates that the surge protection unit 80 includes the resistor 82, the bead 83, the capacitor 84, and the varistor 85, the surge protection units 80 may selectively include more than two of them, and a connection position of the Zener diode 81 may be changed from the anode to the cathode or from the cathode to the anode.

Figure 8:
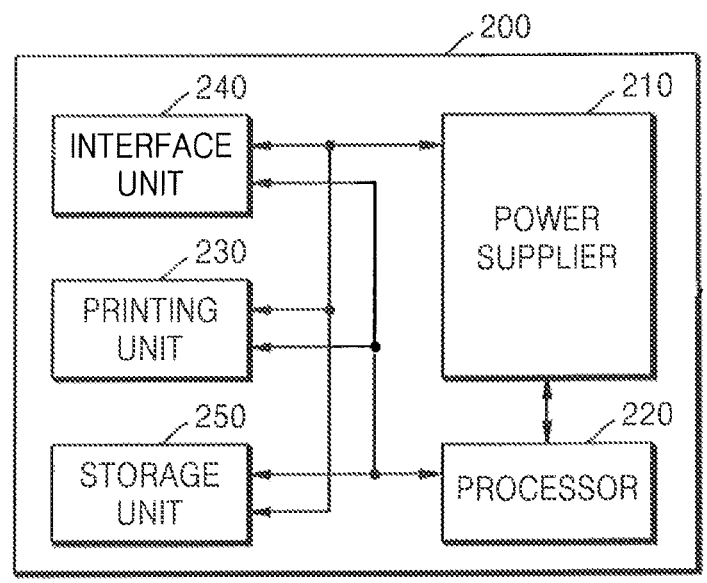
FIG. 8 is a block diagram illustrating an image forming apparatus having a SMPS including a surge protection circuit according to exemplary embodiments of the present general inventive concept.

FIG. 8 is a block diagram illustrating an image forming apparatus 200 having a SMPS including a surge protection circuit according to an embodiment of the present general inventive concept.

Referring to FIG. 8, the image forming apparatus 200 has a power supplier 210 with a SMPS including a surge protection circuit, a processor 220, and a printing unit 230. The image forming apparatus 200 may include an interface unit 240 and a storage unit 250. The power supplier 210 may be a SMPS including a surge protection circuit such as those illustrated and described above in connection with FIGS. 2-7.

The image forming apparatus 200 may be an apparatus to transfer and print image data onto a print medium, according to a digital signal input (e.g., where the input is received from an external device). The image forming apparatus 200 may be a printer or a multifunctional peripheral device (e.g., a device that includes a printer, a scanner, a fax machine, etc.). The external device can be a host device that may be, for example, a personal computer (PC), a laptop computer, a server, a tablet computer, a mobile phone, a portable media player, and/or any other suitable device to provide print data to the image forming apparatus 200. The host device is connectable to the image forming apparatus 200 and is a device where a print driver may be executed to perform a printing operation by the image forming apparatus 200. The user may set one or more options to perform the printing operation by the image forming apparatus 200, by using a printer driver executed by the host device.

The power supplier 210 supplies predetermined power required to operate the image forming apparatus 200. In detail, the power supplier 200 supplies the predetermined power to at least one of the processor 220, the printing unit 230, the interface unit 240, and the storage unit 250 of the image forming apparatus 1300. The power supplier 210 may be any one the SMPS including a surge protection circuit such as those illustrated and described above in connection with FIGS. 2-7.

The processor 220 controls the operation of the image forming apparatus 200. In detail, the processor 220 receives predetermined power from the power supplier 210 and controls at least one of the printing unit 230, the interface unit 240, and the storage unit 250 to perform a printing operation from a command or a request received from an external host device. The processor 220 may be a controller, an integrated circuit, a programmable logic device, a field programmable gate array and/or any other suitable device to control the operation of the image forming apparatus 200.

The interface unit 240 may include a keyboard, a keypad, a touch screen, or a mouse. The interface unit 240 may include a communication interface that may be connected wirelessly or with a wire to receive communication signals from another device. The interface unit 240 may receive input or selections from a user to select one or more operations of the image forming apparatus. The interface unit 240 transmits and receives image data to and from the host device, and may also receive input from a user. The interface unit 1340 can be communicative connected to the host device via a wireless and/or wired communication link. A print option may be selected on the host device, and the selected print option can be transmitted to the processor 1320 through the interface unit 1340. The processor 1320 may control the printing unit 1330 to perform the printing operation.

The storage unit 250 can store the image data, such as image data received via the interface unit 240. The storage unit 250 may include a hard disk drive, a solid state drive, a solid state memory, a flash memory, a random access memory, and/or any suitable storage device to store, for example, applications and/or programs to be executed by the processor 220 and to store data received from the interface unit 240.

The printing unit 230 prints the image data stored in the storage unit 250 or received via the interface unit 240 according to operational controls received from the processor 220.

Figure 9:
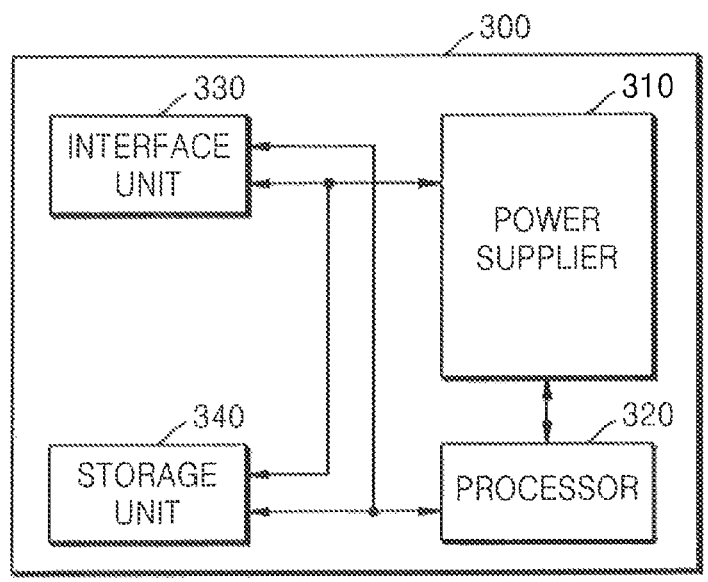
FIG. 9 is a block diagram illustrating an electronic device having a SMPS including a surge protection circuit according to exemplary embodiments of the present general inventive concept.

FIG. 9 is a block diagram illustrating an electronic device 300 having a SMPS including a surge protection circuit according to exemplary embodiments of the present general inventive concept. The electronic device 300 can be a desktop computer, a tablet computer, a portable media player, a media server, a set top box, and/or any electronic device including a SMPS and including a surge protection circuit Referring to FIG. 9, the electronic device 300 may include a power supplier 310, a processor 320, an interface unit 330, and a storage unit 340 that may respectively correspond to the power supplier 210, processor 220, interface unit 240, and the storage unit 250 illustrated in FIG. 8 and describes in detail above.

The power supplier 310 may supply predetermined power required to operate the electronic device 300. More particularly, the power supplier 310 supplies the predetermined power to at least one of the processor 320, the interface unit 330, and the storage unit 340. The power supplier 310 may be any one of the SMPS including a surge protection circuit such as those illustrated and described above in connection with FIGS. 2-7.

The processor 320 can include a controller, integrated circuit, programmable logic device, field programmable gate array, and/or any other device to control the operations of the electronic device 300. The processor 300 can control the read and write operations to the storage unit 340, and can control a display of the user interface 330 to display information processed in the electronic device 300.

The interface unit 330 may include a keyboard, a keypad, a display, a touch screen, or a mouse. The interface unit 1440 may include a communication interface that may be connected wirelessly or with a wire to receive communication signals from another device. The interface unit 330 may receive input or selections from a user to select one or more operations of electronic device 300.

The storage unit 340 may include a hard disk drive, a solid state memory, a flash memory, or a random access memory, etc. to store applications to be executed by the processor 320 and store data and input received from the interface unit 330.

The following experiment has been performed to prove effects of the above-described exemplary embodiments. In the experiment, normal mode noise that was input through a power supply line and common mode noise that was input through a ground line were applied to respective test circuits, and then it was observed whether shutdown occurred. The normal mode noise of 3 kV was applied 40 times, and the common mode noises of 4 kV, 6 kV, and 6.6 kV were applied 80 times, respectively, to perform the experiment. A PWM controller used in the experiment was the L6599A resonance PWM controller of ST Microelectronic Incorporated. The No. 8 pin of the L6599A resonance PWM controller corresponds to the protection pin of the embodiments of the present general inventive concept, and the L6599A resonance PWM controller was shut down when a voltage of more than a threshold voltage 1.85 V was applied to the No. 8 pin. In the experiment, a circuit used in a first test (TEST 1) was the same as that of FIG. 2, and a circuit used in a second test (TEST 2) was a circuit that further included a bead connected to the anode of the Zener diode 81 and a resistor connected to the cathode of the Zener diode 81 in the circuit of FIG. 2. A circuit used in a third test (TEST 3) was a circuit in which the capacitor 84 was removed from the circuit of FIG. 7. The result of the experiment is illustrated in Table 1 below. The numerical values shown in Table 1 below mean (the number of shutdowns, which occurred)/(the number of total noise applications).

TABLE 1

| Surge noise | | Surge protection circuit non-inclusion | TEST 1 | TEST 2 | TEST 3 |
|---|---|---|---|---|---|
| Normal mode | 3 kV | 0/40 | 0/40 | 0/40 | 0/40 |
| Common mode | 4 kV | 67/80 | 0/80 | 0/80 | 0/80 |
| | 6 kV | — | 0/80 | 0/80 | 0/80 |
| | 6.6 kV | — | 8/80 | 4/80 | 0/80 |

Referring to the result of the experiment of Table 1, when a normal mode noise was applied, although a test circuit did not include the surge protection circuit, a shutdown did not occur in the test circuit, and thus, the test circuit stably operated. However, when a common mode noise of 4 kV was applied, a ratio of shutdown generation was more than 80%, and thus, the test circuits unstably operated. Thus, with respect to common mode noises of 6 kV and 6.6 kV, experiments for circuits that did not include the surge protection circuit were not performed. In the cases of TEST 1, TEST 2, and TEST 3, in which noises were applied to test circuits including the surge protection circuit, a shutdown did not occur when common mode noise of 4 kV or 6 kV was applied, and thus, the test circuits stably operated. However, when a common mode noise of 6.6 kV was applied, a shutdown occurred at a ratio of 10% in the case of TEST 1, and a shutdown occurred at a ratio of 5% in the case of TEST 2. However, in the case of TEST 3, a shutdown did not occur although common mode noise of 6.6 kV was applied, and thus, the test circuits stably operated.

Thus, by applying any one of the SMPSs illustrated in FIGS. 2 through 7 to an image forming apparatus and/or an electronic device, such as the image forming apparatus 200 illustrated in FIG. 8 and the electronic device 300 illustrated in FIG. 9, the image forming apparatus may stably operate against surge noise.

Although several few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A switching mode power supply (SMPS) comprising:
a feedback unit to output a predetermined feedback voltage when an output voltage of the SMPS is not within a predetermined range;
a pulse width modulation (PWM) controller that includes a protection pin and cuts off a power supply of the SMPS when a voltage that is applied to the protection pin exceeds a predetermined threshold voltage; and
a surge protection unit including:
a Zener diode having an anode that is connected to the protection pin of the PWM controller and a cathode connected to the feedback unit, and
at least one of a bead, a resistor, a capacitor, and a varistor configured to suppress surge noise,
the bead having one end connected to the anode or the cathode of the Zener diode and the other end connected to the protection pin or the feedback unit,
the resistor having one end connected to the anode or the cathode of the Zener diode and the other end connected to the protection pin or the feedback unit,
the capacitor having one end connected to the anode or the cathode of the Zener diode and the other end connected to a ground, and
the varistor having one end connected to the anode or the cathode of the Zener diode and the other end connected to the ground,
wherein the surge protection unit configured to block an external surge voltage lower than a surge protection capacity of the surge protection unit for blocking a surge voltage input from outside thereof, and, when the output voltage of the SMPS is not within the predetermined range, the surge protection unit configured to apply a voltage obtained by subtracting the surge protection capacity of the surge protection unit from the predetermined feedback voltage output from the feedback unit to the protection pin, and
wherein the surge protection capacity is set higher than the predetermined threshold voltage of the protection pin.

2. The SMPS of claim 1, wherein, when the surge voltage input from outside the surge protection unit exceeds the surge protection capacity of the surge protection unit, the surge protection unit applies a voltage obtained by subtracting the surge protection capacity from the surge voltage to the protection pin.

3. The SMPS of claim 1, wherein the feedback voltage is set higher than a value obtained by adding the surge protection capacity of the surge protection unit to the threshold voltage of the protection pin.

4. The SMPS of claim 1, wherein the at least one of the bead, the resistor, the capacitor, and the varistor is a resistor.

5. The SMPS of claim 1, wherein the at least one of the bead, the resistor, the capacitor, and the varistor is a bead.

6. The SMPS of claim 1, wherein the at least one of the bead, the resistor, the capacitor, and the varistor is a capacitor.

7. The SMPS of claim 1, wherein the at least one of the bead, the resistor, the capacitor, and the varistor is a varistor.

8. An image forming apparatus comprising:
a switching mode power supply (SMPS) to convert an alternating current (AC) power supply into a direct current (DC) power supply to power the image forming apparatus, the SMPS including:
a feedback unit to output a predetermined feedback voltage when an output voltage of the SMPS is not within a predetermined range;

a pulse width modulation (PWM) controller that includes a protection pin and cuts off a power supply of the SMPS when a voltage that is applied to the protection pin exceeds a predetermined threshold voltage; and a surge protection unit including:
a Zener diode having an anode that is connected to the protection pin of the PWM controller and a cathode connected to the feedback unit, and
at least one of a bead, a resistor, a capacitor, and a varistor configured to suppress surge noise, the bead having one end connected to the anode or the cathode of the Zener diode and the other end connected to the protection pin or the feedback unit, the resistor having one end connected to the anode or the cathode of the Zener diode and the other end connected to the protection pin or the feedback unit, the capacitor having one end connected to the anode or the cathode of the Zener diode and the other end connected to a ground, and the varistor having one end connected to the anode or the cathode of the Zener diode and the other end connected to the ground, wherein the surge protection unit configured to block an external surge voltage lower than a surge protection capacity of the surge protection unit for blocking a surge voltage input from outside thereof, and, when the output voltage of the SMPS is not within the predetermined range, the surge protection unit configured to apply a voltage obtained by subtracting the surge protection capacity of the surge protection unit from the predetermined feedback voltage output from the feedback unit to the protection pin, and wherein the surge protection capacity is set higher than the predetermined threshold voltage of the protection pin.

9. The image forming apparatus of claim 8, wherein, when the surge voltage input from outside the surge protection unit exceeds the surge protection capacity of the surge protection unit, the surge protection unit applies a voltage obtained by subtracting the surge protection capacity from the surge voltage to the protection pin.

10. The image forming apparatus of claim 8, wherein the feedback voltage is set higher than a value obtained by adding the surge protection capacity of the surge protection unit to the threshold voltage of the protection pin.

11. The image forming apparatus of claim 8, wherein the at least one of the bead, the resistor, the capacitor, and the varistor to suppress surge noise is a resistor.

12. The image forming apparatus of claim 8, wherein the at least one of the bead, the resistor, the capacitor, and the varistor to suppress surge noise is a bead.

13. The image forming apparatus of claim 8, wherein the surge protection unit further comprises at least one of the bead, the resistor, the capacitor, and the varistor to suppress is a capacitor.

14. The image forming apparatus of claim 8, wherein the at least one of the bead, the resistor, the capacitor, and the varistor is a varistor.

15. A power supply apparatus comprising:
a feedback unit to output a predetermined feedback voltage when an output voltage of the power supply is not within a predetermined range;
a controller to cut off a power to the power supply when a voltage received by the controller exceeds a predetermined threshold voltage; and a surge protection unit including:
a Zener diode having an anode that is connected to the controller and a cathode connected to the feedback unit, and
at least one of a bead, a resistor, a capacitor, and a varistor configured to suppress surge noise, the bead having one end connected to the anode or the cathode of the Zener diode and the other end connected to the protection pin or the feedback unit, the resistor having one end connected to the anode or the cathode of the Zener diode and the other end connected to the protection pin or the feedback unit, the capacitor having one end connected to the anode or the cathode of the Zener diode and the other end connected to a ground, and the varistor having one end connected to the anode or the cathode of the Zener diode and the other end connected to the ground, wherein the surge protection unit configured to block an external surge voltage lower than a surge protection capacity of the surge protection unit for blocking a surge voltage input from outside thereof, and, when the output voltage of the power supply is not within the predetermined range, the surge protection unit configured to apply a voltage obtained by subtracting the surge protection capacity of the surge protection unit from the predetermined feedback voltage output from the feedback unit to the controller, the surge protection capacity being set higher than the predetermined threshold voltage of the controller.

16. An electronic device comprising:
a power supply to power the electronic device, including:
a feedback unit to output a predetermined feedback voltage when an output voltage of the power supply is not within a predetermined range;
a controller to cut off the power when a voltage received by the controller exceeds a predetermined threshold voltage; and a surge protection unit including:
a Zener diode having an anode that is connected to the controller and a cathode connected to the feedback unit, and
at least one of a bead, a resistor, a capacitor, and a varistor configured to suppress surge noise, the bead having one end connected to the anode or the cathode of the Zener diode and the other end connected to a protection pin or the feedback unit, the resistor having one end connected to the anode or the cathode of the Zener diode and the other end connected to the protection pin or the feedback unit, the capacitor having one end connected to the anode or the cathode of the Zener diode and the other end connected to a ground, and the varistor having one end connected to the anode or the cathode of the Zener diode and the other end connected to the ground, wherein the surge protection unit configured to block an external surge voltage lower than a surge protection capacity of the surge protection unit for blocking a surge voltage input from outside thereof, and, when the output voltage of the is not within the predetermined range, the surge protection unit configured to apply a voltage obtained by subtracting the surge protection capacity of the surge protection unit from the predetermined feedback voltage output from the feedback unit to the protection pin, the surge protection capacity is set higher than the predetermined threshold voltage of the protection pin; and an interface powered by the power supply to receive input and display output messages in connection with the operation of the electronic device.

17. A method of providing power to an electronic device, the method comprising:
outputting a predetermined feedback voltage when an output voltage of a power supply that provides power to the electronic device is not within a predetermined range;
cutting off a power to the power supply when a voltage that is received by a controller of the power supply exceeds a predetermined threshold voltage;
blocking an external surge voltage that is lower than a surge protection capacity of a surge protection unit including a Zener diode having an anode connected to a controller and a cathode connected to a feedback unit, and at least one of a bead having one end connected to the anode or the cathode of the Zener diode and the other end connected to a protection pin of a feedback unit, a resistor having one end connected to the anode or the cathode of the Zener diode and the other end connected to the protection pin or the feedback unit, a capacitor having one end connected to the anode or the cathode of the Zener diode and the other end connected to a ground, and a varistor having one end connected to the anode or the cathode of the Zener diode and the other end connected to the ground to suppress surge noise and for blocking a surge voltage input from outside thereof; and
when the output voltage of the power supply is not within the predetermined range, applying a voltage obtained by subtracting the surge protection capacity of the surge protection unit from the predetermined feedback voltage output from the feedback unit to the protection pin, the surge protection capacity being set higher than the predetermined threshold voltage of the protection pin.

* * * * *

UNITED STATES PATENT AND TRADEMARK OFFICE
CERTIFICATE OF CORRECTION

PATENT NO. : 9,941,689 B2  
APPLICATION NO. : 13/645833  
DATED : April 10, 2018  
INVENTOR(S) : Young-jun Song Page 1 of 1

It is certified that error appears in the above-identified patent and that said Letters Patent is hereby corrected as shown below:

In the Claims

In Column 14, Line 60, in Claim 16, after "voltage of the" insert -- SMPS --

Signed and Sealed this  
Twenty-third Day of October, 2018

Andrei Iancu  
*Director of the United States Patent and Trademark Office*